3,420,859
11-IODO-10-UNDECYNOIC ACID AND ITS DERIVATIVES
Akira Ueno, Tokyo, Etsuko Matsuzaki, Saitama-ken, Yoshio Momoki, Yoshino Ishimaru, Gosaku Saito and Sumio Sakai, Tokyo, Japan, assignors to Kaken Kagaku Kabushiki Kaisha, Tokyo, Japan, a corporation of Japan
No Drawing. Filed Mar. 9, 1965, Ser. No. 438,379
Claims priority, application Japan, Mar. 13, 1964, 39/13,839; June 8, 1964, 39/32,221; July 4, 1964, 39/37,265
U.S. Cl. 260—408        7 Claims
Int. Cl. C07c *57/18;* C07c *69/52*

ABSTRACT OF THE DISCLOSURE 11-iodo-10-undecynoic acid and its zinc and phenyl esters of the formula: $IC\equiv C(CH_2)_8COOR$, wherein R is hydrogen, zinc, phenyl or substituted phenyl. The acid is produced by reacting 10-undecynoic acid with iodine in an aqueous lower alcohol solution. The zinc salt is produced by reacting an alkali salt of 11-iodo-10-undecynoic acid with an inorganic zinc salt. The phenyl esters are produced by reacting 11-iodo-10-undecynoyl chloride with a phenol providing the desired phenyl or substituted phenyl radical.

---

The present invention relates to 11-iodo-10-undecynoic acid, its salts and phenyl esters thereof, and the process for the production thereof, said 11-iodo-10-undecynoic acid and its derivatives being novel compounds represented by the general formula of $IC\equiv C(CH_2)_8COOR$ wherein R is a member selected from the group consisting of phenyl, alkyl phenyl, halophenyl, and p-alkoxycarbonylphenyl radicals, hydrogen and zinc.

According to the present invention, 11-iodo-10-undecynoic acid is produced by reacting 10-undecynoic acid with iodine in the presence of caustic alkali by use of alcohol aqueous solution as a solvent. 10-undecynoic acid to be used as the raw material is prepared with high yield in high purity by treating 10,11-dibromoundecenoic acid with caustic alkali in ethanol.

Solvents to be used for carrying out the present invention include lower alcohols such as methanol, ethanol, propyl alcohol and isopropyl alcohol. It is desired for dissolving caustic alkali to include 50–55 percent water. Caustic alkali is dissolved by heating at about 50° C. The solution cooled to room temperature and iodine power is added little by little in the solution under stirring. The amounts of caustic alkali and iodine are 2 and 1–1.1 mols, respectively, based upon 1 mol of 10-undecynoic acid.

The reaction is carried out at room temperature for the first 1–2 hours. Then, the reaction mixture is heated at 45–60° C. under stirring for several hours, and the reaction is completed. The solvent is concentrated under a reduced pressure and the residue is dissolved in appropriate amount of water. The solution is made to be acidic by addition of a mineral acid such as sulfuric acid or hydrochloric acid with cooling, whereby the product is obtained in crystalline form. For purifying, for example, recrystallization is carried out with petroleum ether. Colorless crystals in form of plates are obtained.

The crystals have the melting point of 63–64° C. As the result of analysis it shows the experimental formula of $C_{11}H_{17}O_2I$ and triple bond at 2180 cm.[1] in IR spectrum. Sodium salt and potassium salt of the present product are easily soluble in water, but free acid is hardly soluble in water. The said free acid is easily soluble in usual organic solvent such as alcohols, ethers, benzene, toluene, chloroform, and ligroin.

In order to prepare the zinc salt, an aqueous solution of inorganic zinc salt is added into an aqueous solution of alkali salt of 11-iodo-10-undecynoic acid at room temperature with stirring. As zinc salts, zinc chloride, zinc bromide, zinc iodide, zinc sulfide, zinc nitrate, zinc phosphate and the like are suitably employed. The amount of zinc salt is about 0.55 mol per 1 mol of 11-iodo-10-undecynoic acid. The reaction progresses smoothly at room temperature and is completed in several hours without generating heat. A large amount of precipitate is formed. The precipitate is filtered off and washed well with water. Thereafter, recrystallization is carried out from a large amount of alcohol. The resulting substance has a melting point of 143–6° C. and corresponds to the experimental formula of $C_{22}H_{32}O_4I_2Zn$ as the result of analysis. By IR spectrum, it shows also absorption of terminal acetylene containing halogen at 2170 cm.$^{-1}$ and those of carboxyl at 1400 cm.$^{-1}$ and 1550 cm.$^{-1}$. The present substance is barely soluble in water and organic solvents such as ethers, benzene, chloroform, ketones and ligroin, but it is soluble a little in alcohol and toluene.

For preparation of phenyl esters, 11-iodo-10-undecynoic acid is converted into its acid chloride and then it is reacted with phenols. Undecynoyl chloride is produced by reacting a slight excess amount of thionyl chloride with 11-iodo-10-undecynoic acid at room temperature, and, after the reaction, removing excess thionyl chloride under a reduced pressure. As phenols, for example, there are indicated phenol, alkylphenol, monochlorophenol, trichlorophenol, monobromophenol, tribromophenl, and alkyl esters of p-hydroxybenzoic acid.

As the solvent to be employed, organic solvents such as ether, benzene, toluene, ligroin, petroleum benzene, and petroleum ether are employed suitably. Into these solvents, the above-mentioned phenols or the metallic salt thereof are dissolved or suspended, and then the above-said acid chloride is added drop by drop into the solution. Thereafter, the mixture is gradually heated at 45–60° C. and stirred for several hours.

The reaction is carried out suitably in the molar ratio of 11-iodo-10-undecynoyl chloride to phenol of 1:1.

The solvent is removed from reaction mixture by distillation under a reduced pressure and the residue is washed with 0.5–1% caustic alkali aqueous solution under cooling, then extracted with ether and the ether layer washed well with water, and, after drying with sodium sulfate, the ether is distilled off.

The product is easily decomposed by distillation under a reduced pressure. According, it is desirable to purify by washing with diluted alkali and water. Thus produced esters are almost pale yellow oily substances, which show absorption of terminal acetylene containing halogen at 2170$^{-1}$ in IR spectrum.

11-iodo-10-undecynoic acid and its derivatives to be produced in the present invention has significant antifungal activities against various pathogenic fungi. The results of antifungal tests of 11-iodo-10-undecynoic acid by the usual agar plate culture method at pH 6.0, show activity of 10 μg./ml. against *Candida albicans*, 1 μg./ml. against *Trichophyton asteroides*, 1 μg./ml. against *Trichophyton interdigitale*, and 2 μg./ml. against *Trichophyton purpursum*. It is useful for treatment of fungus diseases.

In the result of tests for bacteriostatic activity against various bacteria, it has been found that the present substance has activity of 100 μg./ml. against *Staphylococcus aureus* and *albus*. The zinc salt has also antibiotic activity of the same degree as that of the acid, but phenyl esters show fungistatic activity of 2–50 μg./ml. which is somewhat lower than those of the former two substances. Undecylenic acid is used clinically for human superficial fungal diseases, but its fungistatic activity is merely 100 μg./ml. The compounds prepared in the present invention can have fungistatic activity of about 100 times as much as undecylenic acid by converting the structure of undecylenic acid into that containing triple bonds at 10–11 position and introducing iodine. The method and the results of experiments of the present substances against experimental trichophytosis on guinea pigs are shown in the following sentences.

Six parts at the back of guinea pigs are depilated and scratched uniformly and slightly by use of a sand paper. Thereafter, a spore suspension containing a definite number of spores of *Trichophyton asteroides* in a physiological salt solution is applied on each scratched areas with a small brush. 2 days after the inoculation, 0.1 cc. of a tincture of the material to be examined is uniformly dropped at the said part by use of a small pipette once a day. 6 animals are used in one group. Among 6 inoculated regions of each animal, one is treated with an alcohol alone, the one with a 10% tincture of undecylenic acid which is used clinically and the others with the present substances in various concentrations.

The macroscopical measurement of the effect is carried out as follows: Degree of scraps on each regions, inflammation of contact dermatitis caused by test substance and trichophytosis are observed by classifying into five classes of from 0 to 5. The effective ratio is calculated by totaling grades of six animals and showing by percentage against that of the tincture only. 13 days after the inoculation, all animals are autopsied and cleaned up well with soap. Thereafter, they are dipped in a 0.1% mercuric chloride aqueous solution for 30 minutes to sterilize. Six skin pieces are cut off from the each regions and cultured on sabouraud agar slant at 27° C. Then, the growth of trichophyton is observed and the effect is expressed as eurative ratio.

As the result, it has been found that 11-iodo-10-undecynoic acid shows effective ratio of 82% in 0.5% tincture, and 91% in 1% tincture, which is substantially better than 34% of undecylenic acid in a 10% tincture as effective control. The curative ratio of undecylenic acid is 23%. On the other hand, the 11-iodo-10-undecynoic acid attains 67% with the 0.5% alcohol solution and 82% with the 1.0% solution. Moreover, no side-reaction is observed in concentration of 0.5% with the 11-iodo-10-undecynoic acid.

Since the zinc salt is hardly soluble in alcohol, it is used suitably in form of an ointment and the phenyl esters are employed suitably both as tincture and ointment. The results of experiments in vivo of the above-mentioned substances show almost the same degree of effect. Moreover, no side reaction is observed in case of 1% concentration.

Many pathogenic fungi propagate inside of the horny layer which covers most of the outside part of the skin, and, therefore, usual sterilizers are not effective. However, undecylenic acid can permeate through the horny layer, and therefore it is effective for superficial dermatomycosis, but, as mentioned above, its antifungal activity is low. Therefore, high concentrations are required for its clinical use. On the other hand, the products of the present invention achieve significant antifungal activity and still retain the ability to penetrate into the horny layer. Moreover, sufficient effect is attained in as low a concentration as about 0.5% and there is no bad smell as undecylenic acid. They are significant characteristics of the present substances.

EXAMPLE 1

11-iodo-10-undecynoic acid

Eight grams of sodium hydroxide is dissolved in 400 cc. of a 80% methanol aqueous solution, and 18.2 g. of 10-undecynoic acid is added into the solution at 15°–20° C. with stirring. 12.7 g. of iodine is added little by little into the resulting solution. The temperature is maintained for about 1 hour.

After allowed to stand for 1 hour at the temperature, the solution is heated at 45–50° C., and stirred for 5 hours. Thereafter, methanol is distilled off under a reduced pressure, and the residue is added with a small amount of water to dissolve. The resulting solution is made to be acidic by adding of dilute hydrochloric acid solution under cooling, to separate pale yellow crystal. The crystals are extracted with ether and the ether layer is washed with water. After drying, the ether layer with sodium sulfate, ether is removed by distillation, and pale yellow crystals are obtained. When recrystallization is carried out with petroleum ether, 24.6 g. of colorless crystals of 11-iodo-10-undecynoic acid in form of plates are obtained. The substance has a melting point of 63–64° C. The yield is 80%.

*Analysis.*—Calcd. $C_{11}H_{17}O_2I$: C, 42.87; H, 5.52; I, 41.21. Found: C, 43.15; H, 5.55; I, 40.91.

EXAMPLE 2

Zinc 11-iodo-10-undecynoate 3.0 g. of 11-iodo-10-undecynoic acid is dissolved in 100 cc. of 0.4% aqueous solution of sodium hydroxide. A solution containing 0.7 g. of zinc chloride dissolved in 1.0 cc. of water is added gradually in the solution at room temperature under stirring. Generation of heat is hardly effected. The reaction progresses smoothly to form gradually colorless crystals. After 2 hours, the crystals are separated, washed with water and subjected to recrytallization with alcohol. Colorless crystals are obtained. The melting point is 143–6° C. and the yield is 80%.

*Analysis.*—Calcd. $C_{22}H_{32}O_4I_2Zn$: C, 38.87; H, 4.7; I, 37.36. Found: C, 38.52; H, 4.91; I, 37.64.

EXAMPLE 3

Phenyl 11-iodo-10-undecynoate 2.0 g. of thionyl chloride is added gradually into 3.0 g. of 11-iodo-10-undecynoic acid with stirring at room temperature, whereby carbon dioxide gas is generated an insoluble matter is dissolved gradually therein. After 1 hour, excess thionyl chloride is removed under a reduced pressure and chloride is obtained. On the other hand, 1.2 g. of phenol is added into 30 cc. of ligroin to dissolve. Then, 11-iodo-10-undecynoyl chloride which is dissolved in 20 cc. of ligroin is dropped therein under stirring. The solution is reacted at 30–40° C. for 3 hours. Then, ligroin is distilled off under a reduced pressure. After the residue is washed well with water, it is added into 20 cc. of ether and dried. By removing ether, 3.5 g. of phenyl 11-iodo-10-undecynoate in pale yellow oil form is obtained. The yield is 94.7%.

*Analysis.*—Calcd. $C_{17}H_{21}O_2I$: C, 53.14; H, 5.51; I, 33.03. Found: C, 53.43; H, 5.57; I, 32.91.

EXAMPLE 4

2-methylphenyl 11-iodo-10-undecynoate 3.3 grams of 11-iodo-10-undecynoyl chloride is dissolved in 20 cc. of ligroin and dropped with 10 cc. of ligroin which contains 1.1 g. of ortho-cresol. The solution is stirred at 50–60° C. for 3 hours, and thereafter ligroin is distilled off under a reduced pressure. The residue is shaken together with cool 0.5% sodium hydroxide solution. Then, the separated oil layer is extracted with 30 cc. of ether. The ether layer is washed well with water and dried. By distilling off ether, 2.7 g. of 2-methylphenyl 11-iodo-10-undecynoate in yellow oil form is obtained. The yield is 67%.

*Analysis.*—Calcd. $C_{18}H_{23}O_2I$: C, 54.28; H, 5.78; I, 31.89. Found: C, 53.85; H, 5.58; I, 31.38.

EXAMPLE 5

4-chlorophenyl 11-iodo-10-undecynoate 3.3 grams of 11-iodo-10-undecynoyl chloride is added into 20 cc. of ligroin and the solution is dropped into 30 cc. of ligroin in which 2.6 g. of 4-chlorophenol is dissolved. The reaction is carried out at 30–40° C. for 3 hours, and ligroin is distilled off under a reduced pressure. Then, the residue is shaken together with a cool 0.5% sodium hydroxide solution. The separated oil layer is extracted with 30 cc. of ether, the ether layer is washed well with water and dried. By distilling off ether, 3.0 g. of 4-chlorophenyl 11-iodo-10-undecynoate in pale yellow oil form is obtained. The yield is 71.5%.

*Analysis.*—Calcd. $C_{17}H_{20}O_2ICl$: C, 48.77; H, 4.81; Cl, 38.78. Found: C, 48.87; H, 4.67; Cl, 38.29.

EXAMPLE 6

2,4,6-tribromophenyl 11-iodo-10-undecynoate 3.3 grams of 11-iodo-10-undecynoyl chloride and 4.1 g. of silver 2,4,6-tribromophenolate silver salt are used and treated in the same way as in Example 3. 4.0 g. of 2,4,6-tribromophenyl 11-iodo-10-undecynoate in yellow oil form is obtained. The yield is 62%.

*Analysis.*—Calcd. $C_{17}H_{18}O_2Br_3I$: C, 32.88; H, 2.9; I, 59.07. Found: C, 33.10; H, 3.00; I, 58.85.

EXAMPLE 7

2,4,5-trichlorophenyl 11-iodo-10-undecynoate 3.3 grams of 11-iodo-10-undecynoyl chloride and 3.1 g. of 2,4,5-trichlorophenol are used and treated in the same manner as in Example 3. 3.9 g. of 2,4,5-trichlorophenyl 11-iodo-10-undecynoate in yellow oil form is obtained. The yield is 76.5%.

*Analysis.*—Calcd. $C_{18}H_{23}O_2I$: C, 41.86; H, 3.69; I, 47.87. Found: C, 42.25; H, 3.71; I, 47.38.

EXAMPLE 8

4-n-propoxycarbonylphenyl 11-iodo-10-undecynoate 3.3 grams of 11-iodo-10-undecynoyl chloride is dissolved in 15 cc. of ligroin and the solution is dropped into a suspension containing 2.6 g. of silver 4-n-propoxycarbonylphenolate and 15 cc. of ligroin. The mixture solution is reacted at 50–60° C. for 4 hours. After cooling, ligroin is distilled off under a reduced pressure. The residue is shaken together with a cool 0.5% sodium hydroxide solution. The solution is extracted with ether, and the ether layer is washed well with water and dried. By distilling off ether, 3.7 g. of 4-n-propoxycarbonylphenyl 11-iodo-undecynoate in yellow oil form is obtained. The yield is 77%.

*Analysis.*—Calcd. $C_{21}H_{27}O_4I$: C, 53.69; H, 5.74; I, 27.00. Found: C, 53.73; H, 5.86; I, 27.31.

What we claim is:

1. A compound having a formula selected from the group consisting of $[IC{\equiv}C(CH_2)_8{-}COO]_2Zn$ and $$IC{\equiv}C(CH_2)_8{-}COOR$$

wherein R is a member selected from the group consisting of hydrogen, phenyl, methylphenyl, halophenyl and propoxycarbonylphenyl radicals.

2. Zinc 11-iodo-10-undecynoate.
3. 11-iodo-10-undecynoic acid.
4. A compound having the formula $$IC{\equiv}C(CH_2)_8{-}COOR$$

wherein R is selected from the group consisting of phenyl, methylphenyl, halophenyl and propoxycarbonylphenyl radicals.

5. The compound according to claim 4, wherein R is selected from the group consisting of 4-chlorophenyl, 2,4,6-tribromophenyl and 2,4,5-trichlorophenyl radicals.

6. The compound according to claim 4, wherein R is selected from the group consisting of 2-methylphenyl and 4-n-propoxycarbonylphenyl radicals.

7. Phenyl 11-iodo-10-undecynoate.

References Cited

Houben-Weyl: Methoden der Organischen Chemie, Band V/4 (1960), pp. 554–7.

Ueno, Matsuzaki and Sakai: Yakugaku Zazzhi, vol. 85 (3–65), pp. 273–6.

NICHOLAS S. PIZZO, *Primary Examiner.*

R. J. GALLAGHER, *Assistant Examiner.*

U.S. Cl. X.R.

424—289, 312